United States Patent
Poirier et al.

(10) Patent No.: US 6,565,743 B1
(45) Date of Patent: May 20, 2003

(54) PORTABLE PURIFICATION CONTAINER WITH CUMULATIVE USE INDICATOR

(75) Inventors: Malcolm D. Poirier, Marietta, GA (US); Paul Metaxatos, Collinsville; David Mathieu, Middleton, both of CT (US); Jeffrey E. Fish, Dacula; Kevin P. McGrath, Alpharetta, both of GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/653,520

(22) Filed: Aug. 31, 2000

Related U.S. Application Data

(60) Provisional application No. 60/151,809, filed on Aug. 31, 1999, and provisional application No. 60/159,339, filed on Oct. 13, 1999.

(51) Int. Cl.⁷ .................... B01D 27/10; B01D 35/143
(52) U.S. Cl. .................... 210/85; 210/91; 210/282; 210/472; 210/469; 215/308; 222/189.07; 116/284
(58) Field of Search .................... 116/311, 284–286, 116/298; 222/30, 36, 189.07, 189.06, 189.09; 215/308; 210/282, 85, 91, 472, 473, 474, 475, 477, 464, 469, 482

(56) References Cited

U.S. PATENT DOCUMENTS

| | | |
|---|---|---|
| 3,335,917 A | 8/1967 | Knight |
| 4,054,526 A | 10/1977 | Muller |
| 4,090,650 A | 5/1978 | Gotta |
| 4,095,812 A | 6/1978 | Rowe |
| 4,151,092 A | 4/1979 | Grimm et al. |
| 4,176,772 A | 12/1979 | Danon |
| 4,181,243 A | 1/1980 | Frahm |
| 4,298,475 A | 11/1981 | Gartner |
| 4,366,922 A | 1/1983 | Levine et al. |
| 4,389,311 A | 6/1983 | La Freniere |
| D272,139 S | 1/1984 | Boughton |

(List continued on next page.)

FOREIGN PATENT DOCUMENTS

| | | | |
|---|---|---|---|
| CA | 2037728 | | 8/1996 |
| CA | 2176518 | | 11/1997 |
| EP | 0 861 809 | * | 9/1998 |
| WO | 96/38382 | | 12/1996 |
| WO | 99/04667 | | 2/1999 |
| WO | WO-00/36207 A1 | * | 6/2000 |
| WO | WO-00/37385 A1 | * | 6/2000 |
| WO | WO-00/37736 A2 | * | 6/2000 |

OTHER PUBLICATIONS

EXSTREAM™ Personal Water Purification System Owner's Manual (Date Unavailable).*
Abstract Only JP 06–253,929 A; Sep. 13, 1994; Toshiba Ceramics Co.
Abstract Only JP 60–143,889 A; Mar. 7, 1985; Healthy Sangyo KK.

*Primary Examiner*—Joseph W. Drodge
*Assistant Examiner*—Terry K. Cecil
(74) *Attorney, Agent, or Firm*—James B. Robinson; Christos S. Kyriakou

(57) ABSTRACT

A portable liquid filtration system includes a container 22 having a filtering assembly 30 therein and an arrangement for indicating the number of times that the cap has been fitted to the container in order to determine the remaining useful life of the filter. The indicator includes a clutch plate 50 having downwardly extending projections that mate with a plurality of upwardly extending projections on the filtering assembly top 34. The cap includes a vent and may include an arrangement to ensure that the filter is positioned correctly therein. Preferably, the indicator releases the filtering assembly after a predetermined number of uses that approximates the life of the filter.

14 Claims, 15 Drawing Sheets

U.S. PATENT DOCUMENTS

| | | |
|---|---|---|
| 4,428,508 A | 1/1984 | Gardikas et al. |
| 4,441,638 A | 4/1984 | Shimano |
| 4,443,336 A | 4/1984 | Bennethum |
| 4,491,520 A | 1/1985 | Jaye |
| 4,529,511 A | 7/1985 | Breeden et al. |
| 4,605,499 A | 8/1986 | Wise |
| 4,669,608 A | 6/1987 | Thompson |
| 4,695,379 A | 9/1987 | Nohren, Jr. et al. |
| 4,703,927 A | 11/1987 | Hanzlik |
| 4,714,550 A | 12/1987 | Malson et al. |
| 4,764,274 A | 8/1988 | Miller |
| 4,816,149 A | 3/1989 | Wekell |
| 4,852,762 A | 8/1989 | Chou-Sheng |
| 4,852,781 A | 8/1989 | Shurnick et al. |
| 4,938,389 A | 7/1990 | Rossi et al. |
| D310,296 S | 9/1990 | Janus |
| 4,955,572 A | 9/1990 | Simmons |
| 4,969,996 A | 11/1990 | Hankammer |
| 4,970,003 A | 11/1990 | Rak |
| 4,979,654 A | 12/1990 | Nohren, Jr. |
| 4,981,022 A | 1/1991 | Snyder |
| 4,986,901 A | 1/1991 | Nohren, Jr. et al. |
| 4,995,976 A | 2/1991 | Vermes et al. |
| 4,999,109 A | 3/1991 | Sabre |
| D315,829 S | 4/1991 | Covington |
| D316,389 S | 4/1991 | Wood et al. |
| D318,095 S | 7/1991 | Hankammer |
| 5,029,719 A | 7/1991 | Solomon |
| 5,040,709 A | 8/1991 | Neugent |
| 5,044,512 A | 9/1991 | Giancaspro et al. |
| 5,045,195 A | 9/1991 | Spangrud et al. |
| D323,430 S | 1/1992 | Niederkorn |
| 5,094,363 A | 3/1992 | Monahan et al. |
| D325,768 S | 4/1992 | Hankammer |
| 5,104,008 A | 4/1992 | Crisci |
| 5,105,958 A | 4/1992 | Patton |
| 5,105,993 A | 4/1992 | La Haye et al. |
| 5,122,272 A | 6/1992 | Iana et al. |
| 5,130,015 A | 7/1992 | Simizu et al. |
| D328,832 S | 8/1992 | Lai |
| 5,139,666 A | 8/1992 | Charbonneau et al. |
| 5,150,815 A | 9/1992 | Saklad |
| D330,993 S | 11/1992 | Robbins, III |
| 5,167,819 A | 12/1992 | Iana et al. |
| 5,190,643 A * | 3/1993 | Duncan et al. |
| 5,211,973 A | 5/1993 | Nohren, Jr. |
| D337,273 S | 7/1993 | Thatcher |
| D337,274 S | 7/1993 | Thatcher |
| D339,068 S | 9/1993 | Bell et al. |
| D339,503 S | 9/1993 | Callaway |
| D340,217 S | 10/1993 | Delage et al. |
| 5,251,777 A | 10/1993 | McMahon |
| 5,268,093 A | 12/1993 | Hembree et al. |
| 5,273,649 A | 12/1993 | Magnusson et al. |
| 5,301,858 A | 4/1994 | Hollander |
| D348,802 S | 7/1994 | Miller, III |
| 5,337,918 A | 8/1994 | Wang |
| D351,312 S | 10/1994 | Sharon et al. |
| D351,313 S | 10/1994 | Giard, Jr. |
| D354,882 S | 1/1995 | Hurst et al. |
| D356,231 S | 3/1995 | Peyton, Jr. |
| D356,260 S | 3/1995 | Frank |
| D356,542 S | 3/1995 | Finkiewicz et al. |
| D358,530 S | 5/1995 | Mehra et al. |
| 5,415,774 A | 5/1995 | Cowan et al. |
| 5,417,860 A | 5/1995 | Kay |
| D358,964 S | 6/1995 | Foster et al. |
| D359,090 S | 6/1995 | Van Der Hoeven |
| D359,654 S | 6/1995 | Westgerdes |
| D359,655 S | 6/1995 | Hurst et al. |
| 5,431,813 A | 7/1995 | Daniels |
| D361,244 S | 8/1995 | Thompson |
| 5,456,831 A | 10/1995 | Sullivan |
| 5,465,866 A | 11/1995 | Belcastro |
| D365,926 S | 1/1996 | D'Angelo |
| D367,425 S | 2/1996 | Allen |
| 5,497,920 A | 3/1996 | Moeller et al. |
| 5,503,740 A | 4/1996 | Callaghan et al. |
| 5,509,605 A | 4/1996 | Cripe |
| 5,513,762 A | 5/1996 | Janani |
| 5,518,613 A | 5/1996 | Koczur et al. |
| D370,635 S | 6/1996 | Dutton |
| 5,529,217 A | 6/1996 | Siegel |
| D371,489 S | 7/1996 | Deltoro |
| 5,536,396 A | 7/1996 | Mudra et al. |
| D372,836 S | 8/1996 | Hurst et al. |
| 5,545,315 A | 8/1996 | Lonneman |
| D373,240 S | 9/1996 | Parnell |
| D373,928 S | 9/1996 | Green |
| 5,560,513 A | 10/1996 | Jarrell |
| 5,567,308 A | 10/1996 | Visser |
| D376,730 S | 12/1996 | Hurst et al. |
| D377,137 S | 1/1997 | Hurst |
| 5,597,087 A | 1/1997 | Vinarsky |
| D377,737 S | 2/1997 | Kristnik |
| 5,603,830 A * | 2/1997 | Everhart et al. |
| 5,609,759 A | 3/1997 | Nohren et al. |
| 5,616,242 A | 4/1997 | Mandola |
| 5,624,064 A | 4/1997 | McGee, Jr. |
| 5,626,255 A | 5/1997 | Myers |
| 5,628,352 A | 5/1997 | Gracyalny et al. |
| 5,635,079 A | 6/1997 | Becking, II |
| D381,271 S | 7/1997 | Paoloski |
| 5,653,878 A | 8/1997 | Reid |
| D383,941 S | 9/1997 | Petrie |
| 5,676,285 A | 10/1997 | Vinarsky |
| 5,681,463 A | 10/1997 | Shimizu et al. |
| 5,688,397 A | 11/1997 | Malmborg |
| D391,447 S | 3/1998 | Reid |
| D391,448 S | 3/1998 | Winer et al. |
| 5,732,836 A * | 3/1998 | Barker et al. |
| D400,399 S | 11/1998 | Hurst |
| D400,400 S | 11/1998 | Hurst |
| 5,840,185 A | 11/1998 | Hughes et al. |
| 5,855,788 A * | 1/1999 | Everhart et al. |
| 5,873,995 A * | 2/1999 | Huang et al. |
| 5,882,507 A * | 3/1999 | Tanner et al. |
| D408,622 S | 4/1999 | Fletcher |
| D408,684 S | 4/1999 | Helm |
| 5,890,620 A | 4/1999 | Belcastro |
| 5,900,138 A * | 5/1999 | Moretto |
| 5,901,882 A | 5/1999 | Siegel |
| 5,914,045 A | 6/1999 | Palmer et al. |
| D412,087 S | 7/1999 | Spencer |
| 5,928,512 A | 7/1999 | Hatch et al. |
| D417,590 S | 12/1999 | Kato |
| D418,198 S | 12/1999 | Bainton |
| 6,033,557 A * | 3/2000 | Gebhard et al. |

* cited by examiner

PORTABLE PURIFICATION CONTAINER WITH CUMULATIVE USE INDICATOR

CROSS-REFERENCES TO RELATED APPLICATIONS

This application claims the benefit of priority from U.S. Provisional Application No. 60/151,809 filed on Aug. 31, 1999 and U.S. Provisional Application No. 60/159,339 filed on Oct. 13, 1999 both of which are hereby incorporated by reference in their entirety.

FIELD OF THE INVENTION

The present invention relates to fluid purification systems. In a particularly desirable embodiment, the present invention relates to a portable fluid filtration system for filtering aqueous liquids, particularly water.

BACKGROUND OF THE INVENTION

Purification systems and filtration systems are used to provide cleaner water for drinking and other uses. Generally, filtration systems provide cleaner water and other fluids, including gases, by removing particulates from the fluids. Recently, filtration systems have been developed that can remove extremely small particles, including biological particles. As used herein, purification systems include any system, arrangement or apparatus that can be used to provide purer water or other fluids by mechanically filtering the water or by using any other arrangement or combination of arrangements including, but not limited to, chemical means for improving the quality of the water.

Most purification and filtration systems are not portable and are not easily packable. Such systems are not amenable to use by an individual when traveling, hiking or otherwise moving about. Current portable purification systems used for camping are referred to as pump-style water purification systems and require a plurality of components that must be assembled before use. Such systems require separate containers, hoses and pumps that must be connected and are not convenient and easy to use. Few, if any, of these portable purification systems provide an indication of the number of times that the system or the filtering component of such a system has been used. Therefore, a user of such a system is required to monitor the length of time that a filter or system has been used, the cumulative volume of liquid that has been filtered, or just simply guess at how long or how many times the filter has been used so that the user of the system can remember when to dispose of or replace the replaceable filtering component of the system at the end of the filtering component's useful life.

What is needed in the art is a means of providing a user of a portable purification system an indication of the number of times a portable purification system or the replaceable filtering component of a portable filtration system has been used. What is further needed is a portable water filtration system that is easy and economical to use, that gives an individual using the portable water filtration system an indication as to how many times the filtering component of the portable filtration system has been used, and that provides a simple means of warning a user of the system as to when to change the filtering component or to dispose of the system.

BRIEF DESCRIPTION OF THE INVENTION

The present invention provides a mechanism that indicates the number of times the cover has been removed and replaced onto a container and, thus, indirectly provides an indication of the number of times the filter has been used and the cumulative volume of liquid that has been filtered. The mechanism can be reset when a replaceable arrangement for purifying, for example a filter, is replaced. In one embodiment, the present invention is a portable purification system that comprises a container, a cap removably fitted to the container, and an arrangement for indicating the number of times that the cap has been has been fitted to the container. In another embodiment, the portable purification system of the present invention comprises a container defining an opening; a cap adapted to close the opening and being removably fitted to the container; a filter; and an arrangement for indicating the number of times that the cap has been has been fitted to the container.

In at least one desirable embodiment, the present invention is a portable water purification system that eliminates the need for an individual to carry or locate safe water. In this desirable embodiment, the purification component of the system removes harmful cysts and bacteria. The purification component can be replaced or the entire system can be discarded when the purification component ceases to function effectively. Alternatively, the purification component can be substituted with a new purification component for a particular desired use or can be substituted with a purification component including chemical purification means or a combination of any such purification components or purification means for another particular desired use.

In another embodiment, the indication mechanism also has an automatic ejection feature that indicates the end of the useful life of the purification component of the system and automatically ejects the purification component, for example a filter, from the cap assembly.

DETAILED DESCRIPTION OF THE INVENTION

The purification system described herein enables a user to drink freshly filtered fluid and provides an indication as to the number or times that the purification system has been used. More particularly, the present invention provides an indication as to number of times that a cap assembly that forms one portion of the system has been removed and refitted to a container that forms another portion of the system. The present invention comprises a cap and an arrangement for indicating the number of times that the cap has been fitted or otherwise mated to the container. The arrangement for indicating provides an indication as to the number of times that the container that forms part of the system has been opened and resealed and provides an indirect indication as to when a filter or other arrangement for purifying water that forms part of the purification system has reached the end of its useful life. Advantageously, the present invention provides a user of the system a warning prior to when the filter or other arrangement for purification should be replaced. In yet another embodiment of the present invention, the portable filtration system provides an automatic ejection mechanism that automatically releases and ejects the replaceable arrangement for purifying when the system has been used a predetermined number of times. In this embodiment, the indicator mechanism stops rotating when the filter or other arrangement for purifying has been used a predetermined number of times and is ejected from the cap assembly when the cap assembly is separated form the system.

When the system of the present invention comprises a proper filter or other arrangement for purification or a combination thereof, the portable purification system of the present invention can be used by an individual as a personal water purification system to provide safe, clean water at any location. In yet another desirable embodiment, the system incorporates a filter that removes bacteria, the present invention provides a personal hydration system that can be used by an individual that is hiking, camping or otherwise traveling in a location in which a safe supply of water is not readily available with a convenient supply of clean and safe drinking water.

Figure 1:
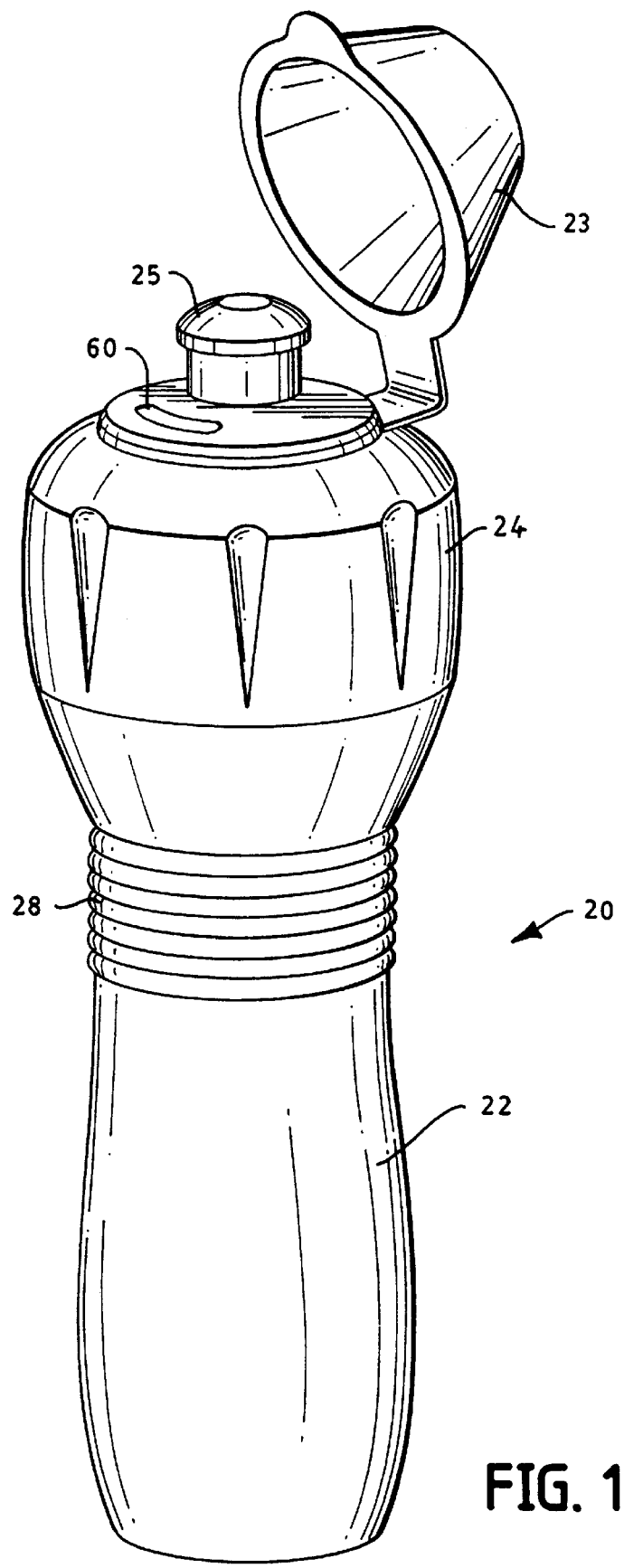
FIG. 1 is a perspective view of a first embodiment of a portable purification system of the present invention.
Figure 2:
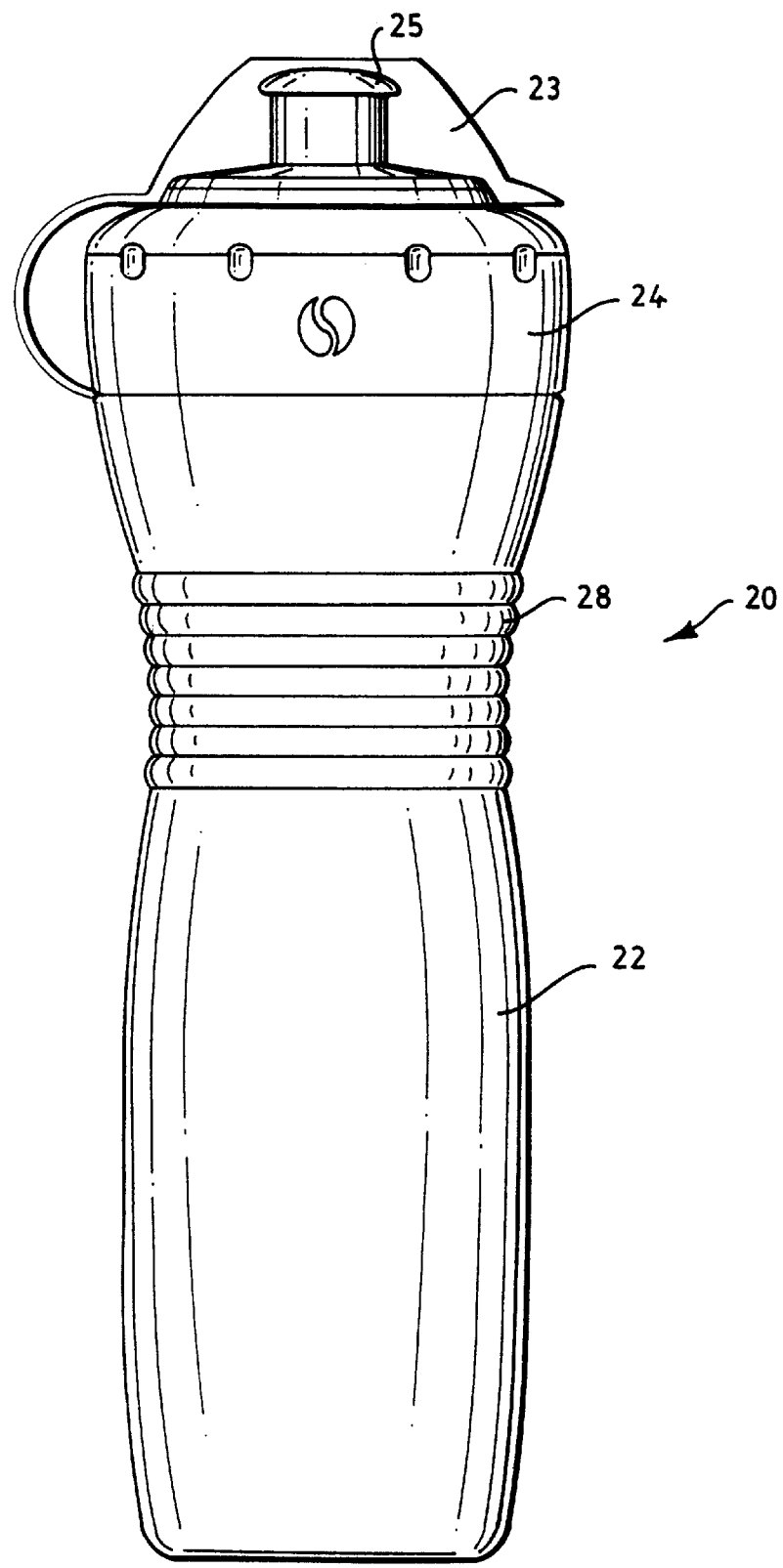
FIG. 2 is a side view of the embodiment illustrated in FIG. 1.

The present invention is directed to a portable purification system 20, a first embodiment of which is illustrated in FIGS. 1–13. The first embodiment is shown in perspective in FIG. 1. FIG. 2 is a side view of the first illustrated embodiment. In the illustrated embodiment, the portable purification system 20 includes a container 22, an overcap 23, a cap 24, and a mouthpiece 25. The form and shape of the container 22 can vary greatly. As shown therein, the container 22 may be cylindrical in shape, but other shapes and configurations of the container 22 are also suitable for use with the present invention. The container 22 should be formed of a flexible material such as plastic so that the container 22 can be squeezed by a consumer to force water out of the container 22. Desirably, the container 22 is resilient and returns to its original shape. However, other materials may also be used to manufacture the container 22. As shown in FIGS. 1, 2 and 4, the container 22 may further include a grippable portion 28, which permits a user to more easily grasp and carry the container 22. In a desired embodiment, the container 22 is of the size and shape of a standard sports flask of the type currently used by bicyclists and other athletes.

Figure 3:
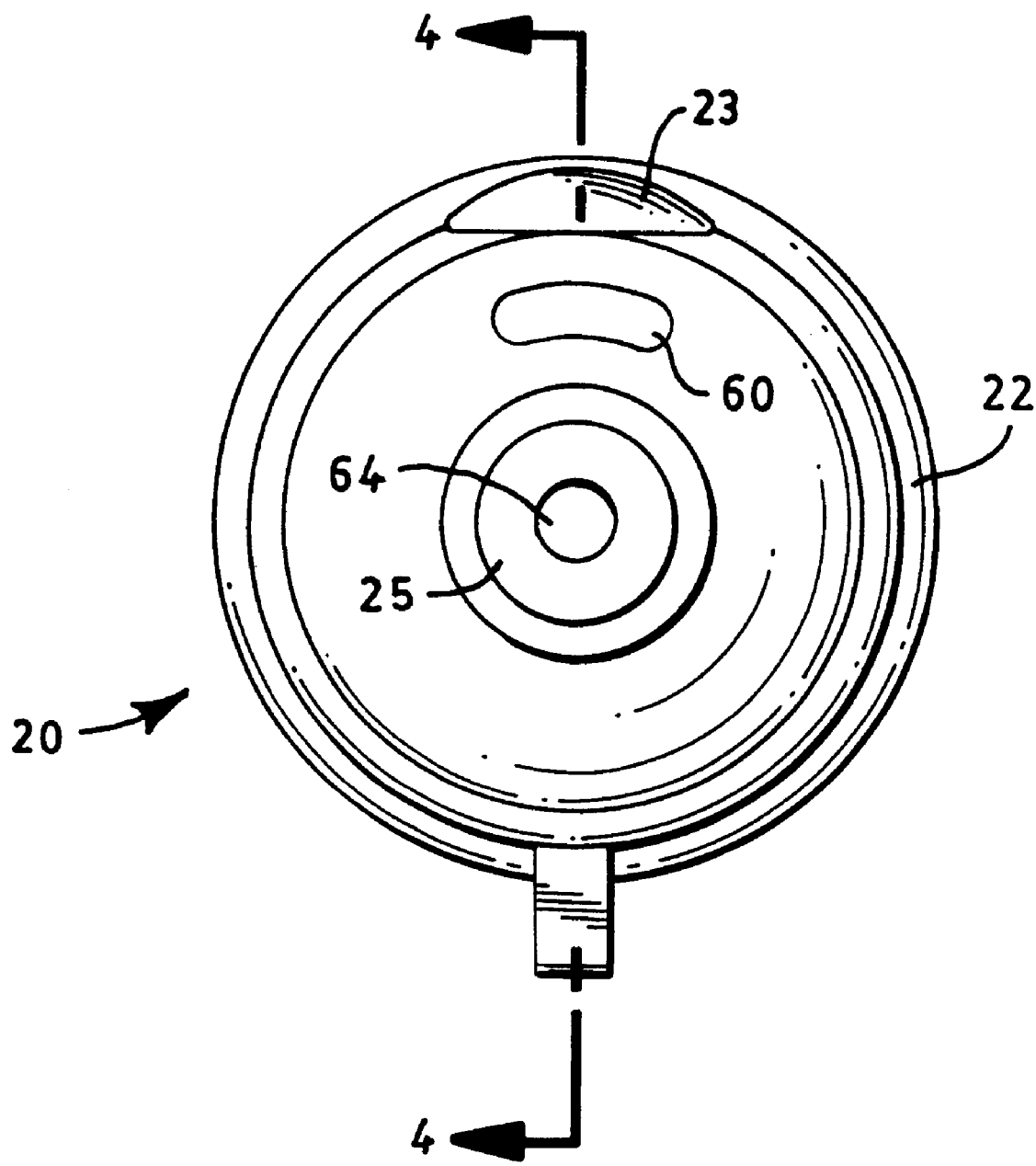
FIG. 3 is a top view of the embodiment illustrated in FIGS. 1 and 2.
Figure 4:
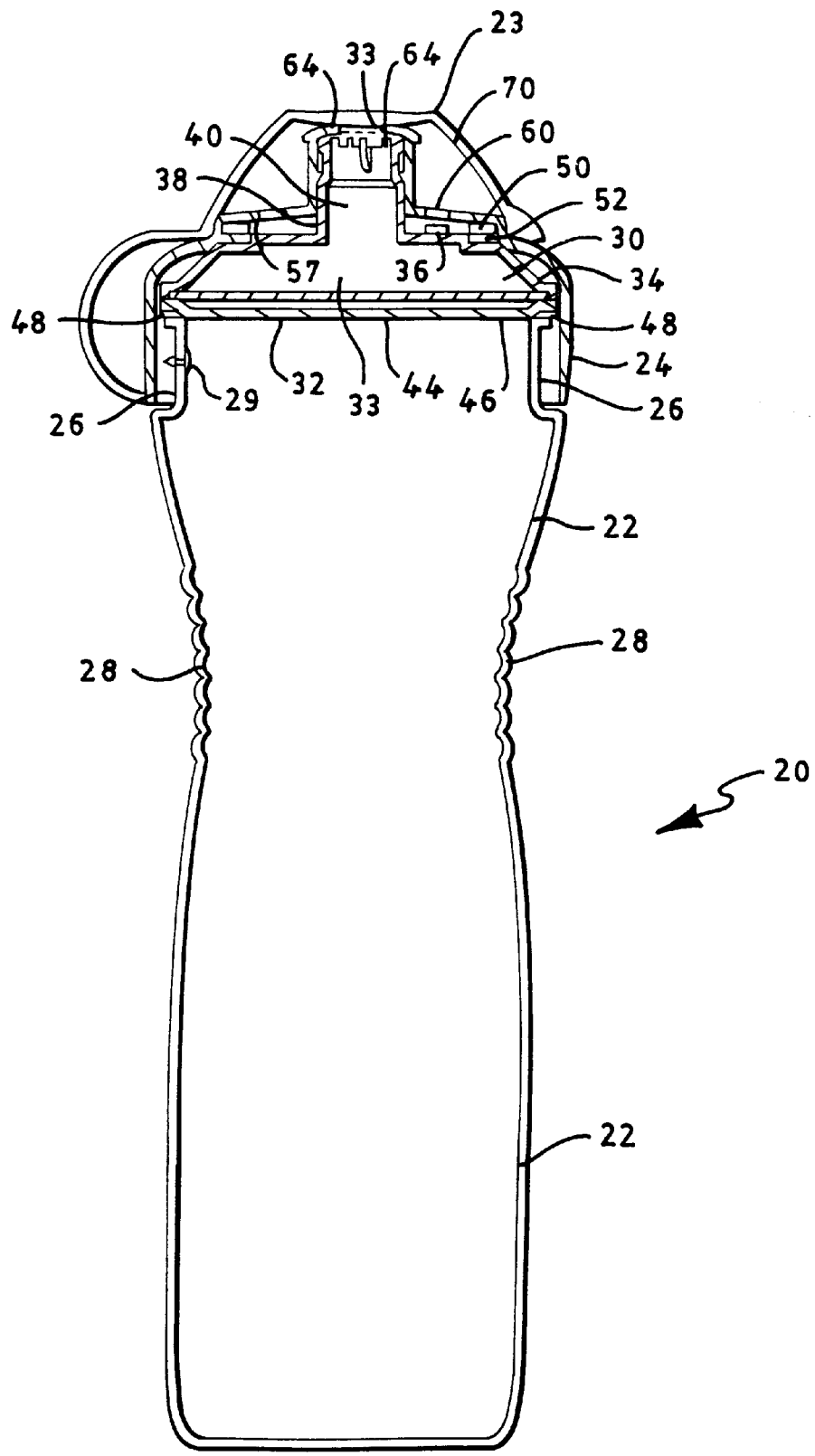
FIG. 4 is a cross-sectional view of the embodiment illustrated in FIGS. 1–3, taken along line 4—4.

The overcap 23, a top view of which is depicted in FIG. 3, is configured to be releasably attached to the portable purification system 20 and to cover the mouthpiece 25. The overcap 23 can be used to cover the mouthpiece 25 and protect the mouthpiece 25 from dust and other debris and contaminants when not in use. The overcap 23 may be formed of a variety of materials, such as, for example, an opaque, translucent or transparent plastic. The overcap 23 may also be variously attached to the container 22 or other portion of the portable purification system 20 by a leash, a tether or other arrangement for attachment 3.

The cap 24 engages an upper portion 26 of the container 22, which is best seen in FIG. 4. FIG. 4 is a cross-sectional view of the embodiment depicted in FIG. 3, taken along line 4—4. The cap 24 may be formed of a variety of materials, such as, for example, plastics, metals and ceramics. The cap 24 and the upper portion 26 of the container 22 may be variously configured to releasably attach to one another, such as, for example, by threads positioned on the cap 24 and the upper portion 26 of the container 22.

As shown in FIG. 4, the container 22 may further include an optional arrangement for venting 29 air into the container 22. Desirably, the arrangement for venting 29 is a one way sealing device that prevents backflow and is configured such that the arrangement for venting 29 permits air from outside of the container to enter the container 22 through the arrangement for venting 29 but does not permit liquid and air to flow out through the arrangement for venting 29. Examples of arrangement for venting 29 that provide a one way function include, but are not limited to, backflow preventers, check valves, flapper valves, duckbill valves, umbrella valves, VERNEER valves, etc. In the illustrated embodiments, the arrangement for venting 29 is provided in an upper portion 26 of the container 22 proximate to the mouth of the container. The use of an arrangement for venting in combination with the present invention is particularly desirable when the arrangement for purifying is not readily wetted by the fluid being purified, for example a hydrophobic filter. The arrangement for venting prevents reverse airflow through the arrangement for purifying and thus prevents the arrangement for purifying form drying once the arrangement for purifying has been wetted.

As seen in FIG. 4, the portable purification system 20 further includes a filtering assembly 30. In the illustrated embodiment, the filtering assembly 30 is attachable to and retained within the cap 24. As seen in FIGS. 4, 8, 10, 14, 15 and 18, the filtering assembly 30 may include a base 32 and an upper member 34 that may be attached to each other by a variety of methods. For example, the base 32 and the upper member 34 may include features that mechanically interlock, such as, for example, snap or thread features. Alternately, the base 32 and the upper member 34 may be sonically or otherwise welded together and the filter 46 is replaced by replaced by removing and replacing the entire filtering assembly 30. When the base 32 and the upper member 34 are joined, a cavity 33 is formed therebetween. A filter 46 or other arrangement for purifying may be disposed within the cavity 33. In at least one embodiment, the base 32 and the upper member 34 are molded as a single piece around the filter 46. Desirably, the base 32 and the upper member 34 may be attached to one another by means of ultrasonic welding or adhesive to form the cavity 33 in which a filter 46, filtration media, or other arrangement for purifying is disposed.

As also shown in FIGS. 4, 5, and 7–10, the upper member 34 includes an upper surface upon which an indicator boss 36 and a mouthpiece post 38 are disposed. A channel 40 is formed within the mouthpiece post 38 and is fluidly connected to the cavity 33. Thus, fluid may enter the filtering assembly 30 through a fluid inlet 44 that is formed in the base 32. The fluid may then flow through the cavity 33 and into the channel 40 so that an individual may drink filtered water from the portable purification system 20. The filter 46 is positioned within the cavity 33 so that fluid flowing into the cavity 33 must pass through the filter 46 before entering the channel 40. The filter 46 may be formed of many materials, such as, for example, block activated carbon, granular activated carbon, nonwoven materials, or combinations of such and similar materials. Desirable filters and methods of making desirable filters that can be used a as component of the present invention are disclosed in U.S. Pat. No. 5,855,788 and PCT International Application Nos. WO 00/36207 WO 00/37385 and WO 00/37736, which are hereby incorporated by reference in their entirety. Filters disclosed in these documents that comprise fibers coated with a cationically charged coating are capable of removing bacteria and provide an efficient means to provide safe bacteria-free drinking water. A filter that removes caffeine from caffeine containing liquids is disclosed in U.S. Pat. No. 5,603,830 and can be used in conjunction with or as the arrangement for purifying in the system of the present invention. For example, the filter disclosed in U.S. Pat. No. 5,603,830 could be used with the present system to provide decaffeinated coffee. The filtering assembly 30 may further include a filter support (not shown) that enables the filter 46 to be retained in the appropriate position.

Figure 5:
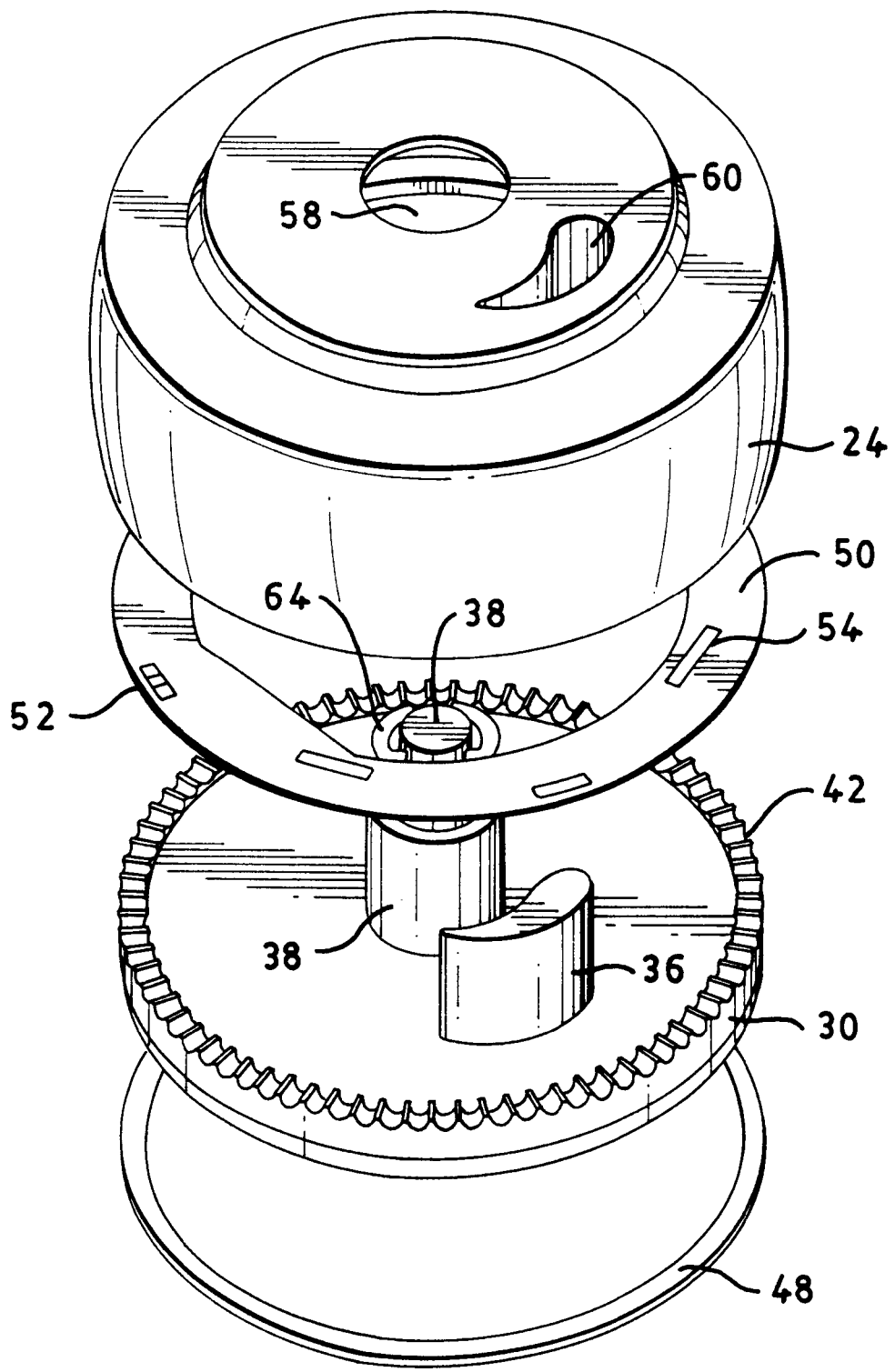
FIG. 5 is an exploded view of a portion of a cap assembly of the embodiment illustrated in FIGS. 1–4.

FIG. 5 is an exploded view that depicts the relationship of the cap 24 to the filtering assembly 30. As shown therein, the upper member 34 of the filtering assembly 30 may further include a plurality of ridges 42 disposed along its outer edge and extending upwardly therefrom. In selected embodiments, a seal 48 may be disposed between the container 22 and the lower portion of the filtering assembly 30 to prevent liquid within the container 22 from exiting the portable purification system 20 at the interface between the container 22 and the cap 24. As best shown in FIGS. 4 and 5, the seal 48 may be an annular seal, although other seal configurations may be utilized with the present invention. The seal 48 may be formed of a flexible, resilient or elastic material such as, for example, rubber, silicone, or the like. In some embodiments, the seal 48 may be attached to or part of the lower portion of the filtering assembly 30 or may be attached to or part of the container 22 proximate the mouth of the container 22.

Figure 6:
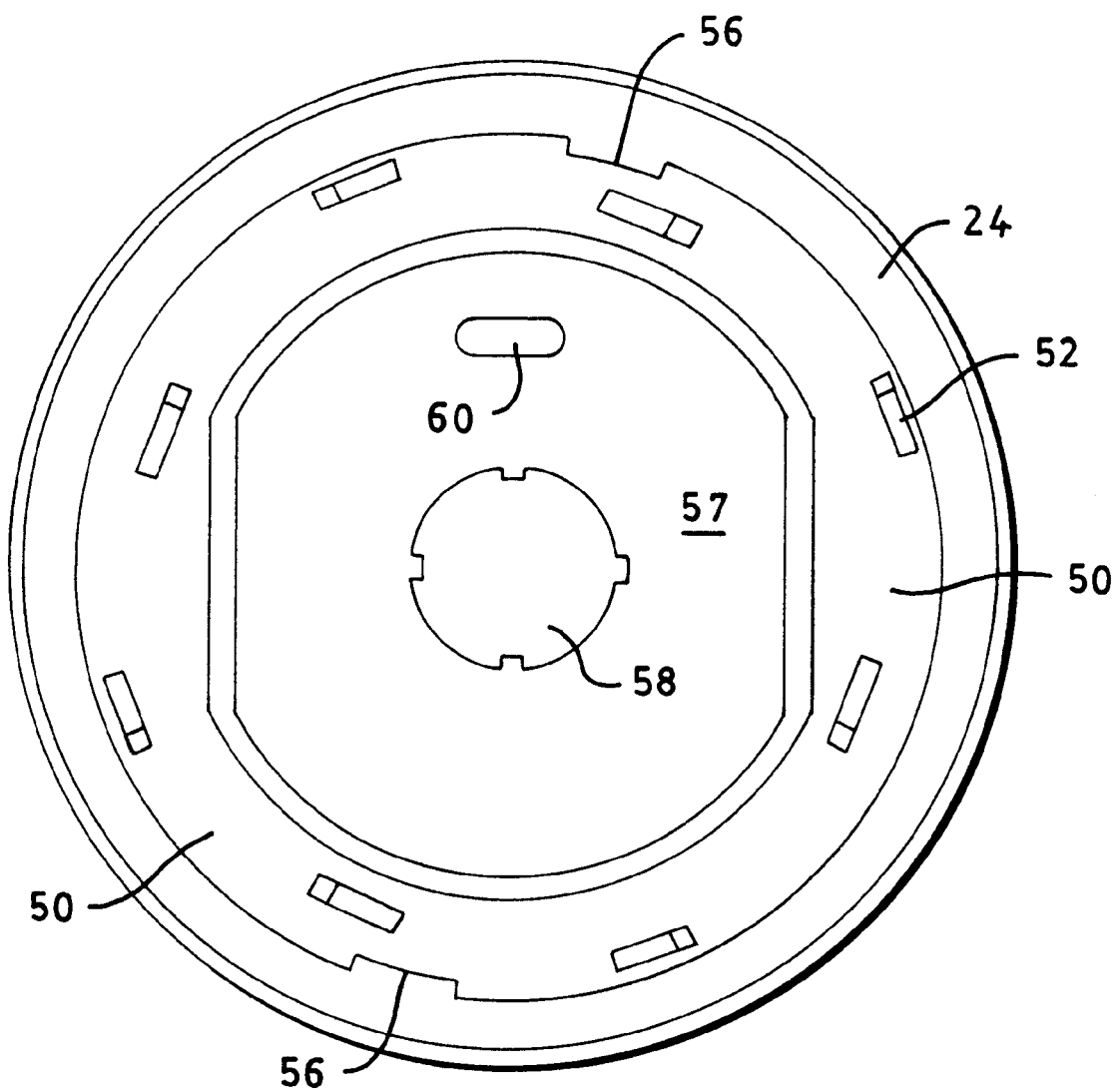
FIG. 6 is a bottom view of a cap and a clutch plate inserted within the cap.

A clutch 50, best shown in FIGS. 5, 6, 12, and 13, is provided and may be formed as a flat ring having a central aperture 51 which may include two arcuate sides and two straight sides, each arcuate side being positioned between the straight sides. The clutch 50 may be formed from a variety of materials such as, for example, plastic, metal, or the like. The clutch 50 may include, in selected embodiments, a plurality of upwardly extending tabs 54 and a plurality of downwardly extending tabs 52. In some embodiments, the upwardly extending tabs 54 are disposed near the outer edge of the clutch 50, while the downwardly extending tabs 52 are disposed near the inner edge of the clutch 50. As shown in FIG. 6, which depicts the interior of the cap 24, the clutch 50 is attached to the cap 24. The clutch may be attached in a variety of ways, including press-fit, snap-fit, or the like. In the embodiment depicted in FIG. 6, the clutch 50 may be retained within the cap 24 by a plurality of inwardly extending bosses 56. As shown in FIGS. 4 and 6, the clutch 50 is secured to the underside surface 57 of the cap 24 so that the clutch 50 does not move with respect to the cap 24. The upwardly extending tabs 54 also assist in preventing relative movement between the cap 24 and the clutch 50.

Once the clutch 50 has been attached to the cap 24, the filtering assembly 30 is placed within the interior of the cap 24. As shown in FIGS. 4 and 5, the clutch 50 is thus positioned above the filtering assembly 30, the downwardly extending tabs 52 engaging the plurality of ridges 42. The filtering assembly 30 is configured to be initially placed within the interior of the cap 24 in a single, predetermined position. In this predetermined position, the indicator boss 36 may or may not be visible to a user through an indicator aperture 60 in the cap 24. In certain embodiments where the indicator boss 36 is positioned on only a portion of the upper surface of the filtering assembly 30, such as in the embodiment shown in FIG. 6, the indicator boss 36 would not be visible to the user. If the indicator boss 36 extends fully around the mouthpiece post 38, as shown in the embodiment depicted in FIG. 10, a portion of the indicator boss 36 will, at all times, be visible to the user. In such an embodiment, a portion of the indicator boss may be colored differently than the remainder of the indicator boss 36. In these embodiments, the predetermined installation position of the filtering assembly 30 will ensure that the differently colored portion of the indicator boss 36 is not visible to the user through the indicating aperture 60 formed in the cap 24.

As the filtering assembly 30 is installed into the cap 24, the mouthpiece post 38 passes through the mouthpiece aperture 58 formed in the cap 24. The filtering assembly 30 and the seal 48 are securely retained within the cap 24 so that a user may threadably engage the cap 24 to the container 22.

Figure 7:
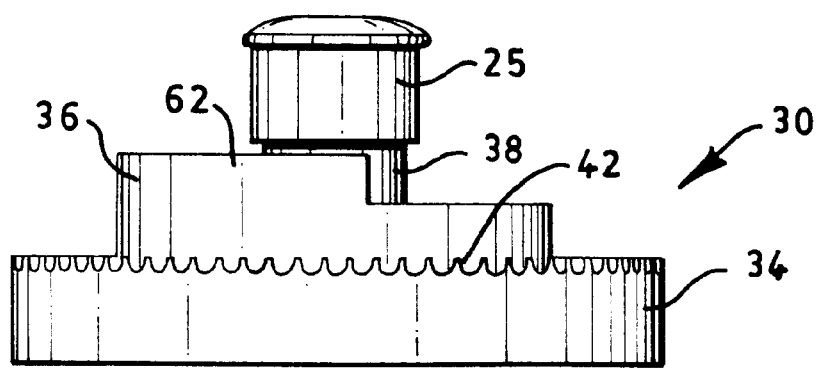
FIG. 7 is a side view of an embodiment of a filtering assembly of the present invention.
Figure 8:
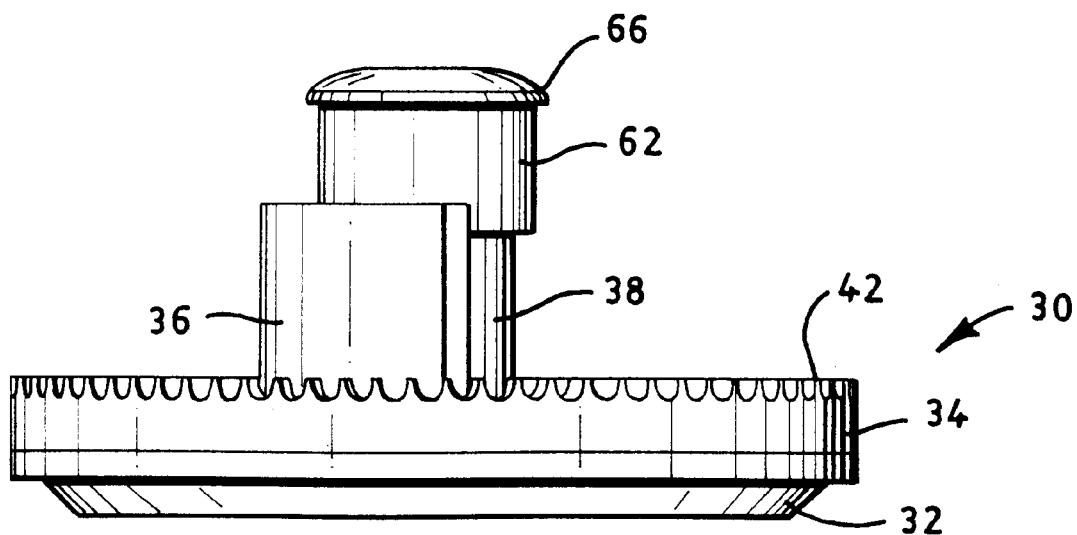
FIG. 8 is a side view of another embodiment a filtering assembly of the present invention.
Figure 9:
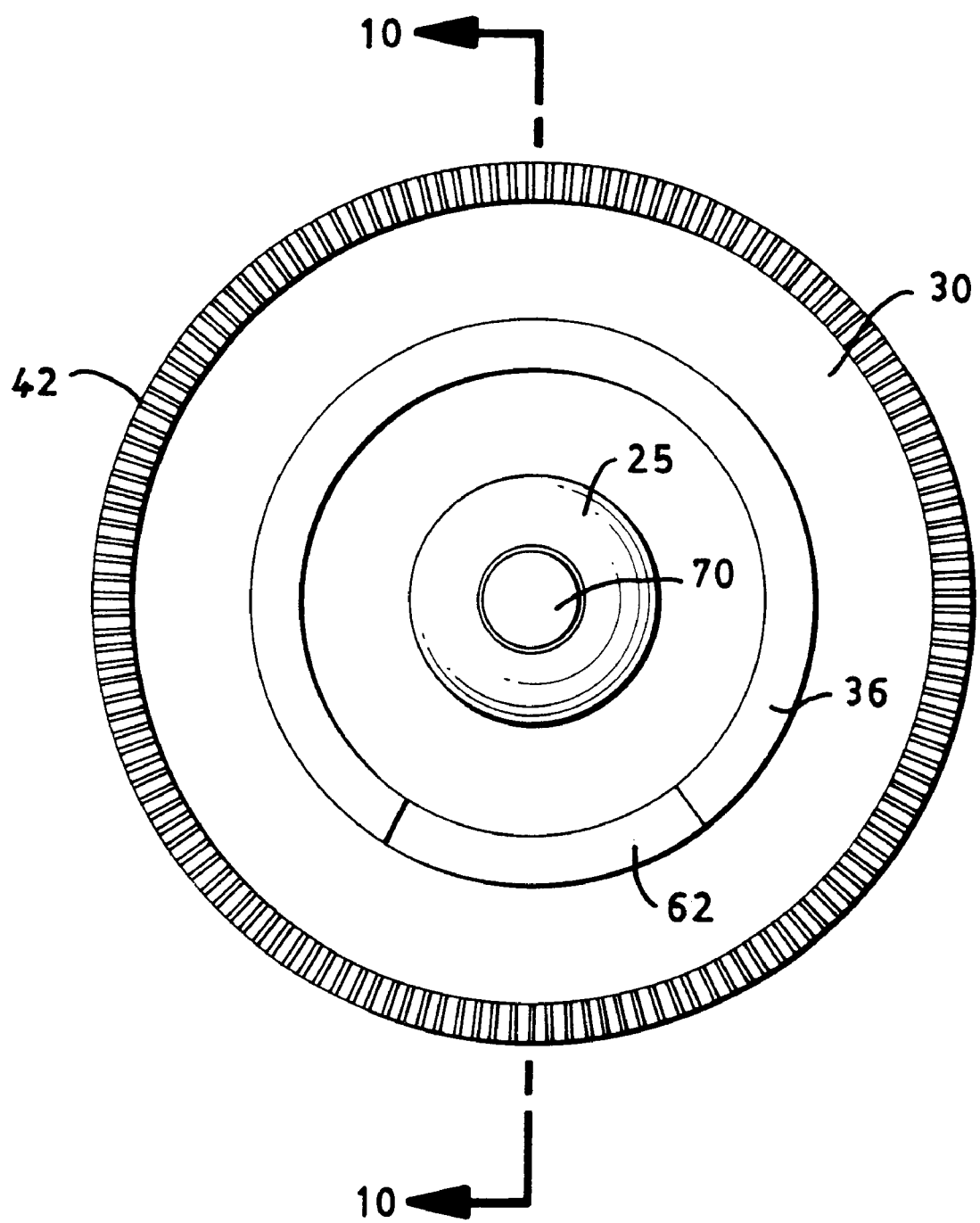
FIG. 9 is a top view of the filtering assembly depicted in FIG. 8.

FIG. 7 is a side view of an alternate embodiment of the filtering assembly 30, illustrating an alternate configuration of the indicator boss 36. As shown therein, the indicator boss 36 extends upwardly from the upper surface of the filtering assembly 30 and may be variously shaped. For example, the indicator boss 36 may have a cross-section which is shaped as a teardrop, rectangle, oval, or the like. As shown in FIG. 7 and FIG. 9, the indicator boss 36 is elongated and includes a raised portion 62. At least a portion of the upper surface of the indicator boss 36 may be of a different coloration from that of the rest of the part. FIG. 8 is a side view of another embodiment of the filtering assembly 30, the indicator boss 36 shown therein (and also shown in FIG. 5) having an approximately teardrop shape.

Figure 10:
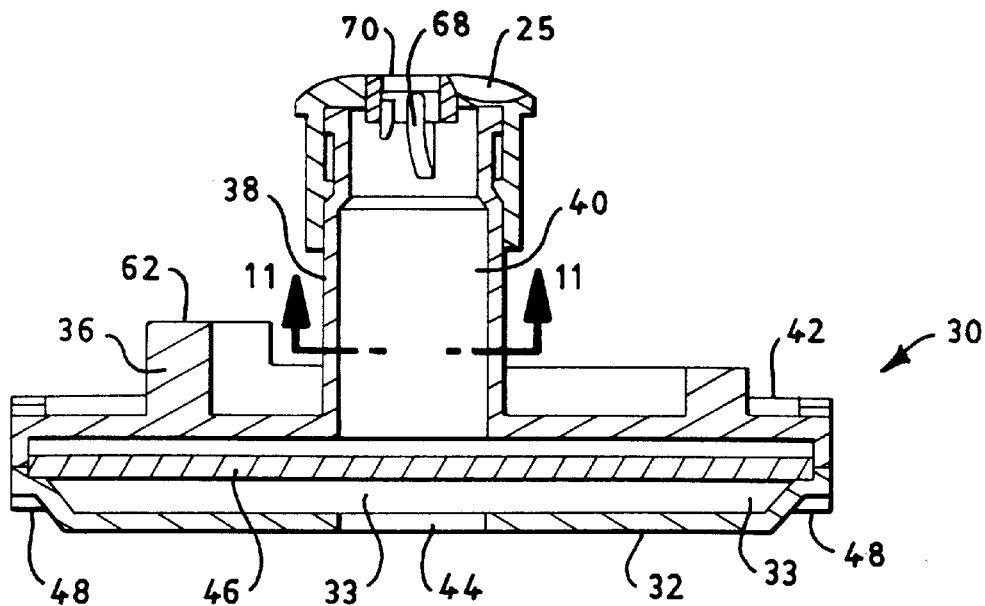
FIG. 10 is a cross-sectional view of the filtering assembly depicted in FIG. 9, taken along line 10—10.
Figure 11:
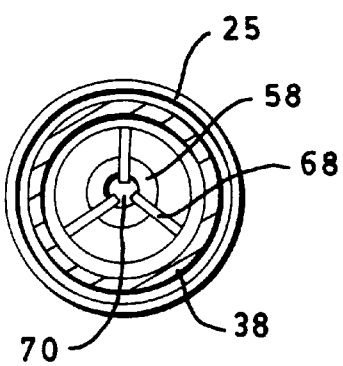
FIG. 11 is a cross-sectional view of a mouthpiece post of the filtering assembly depicted in FIG. 10, taken along line 11—11.
Figure 13:
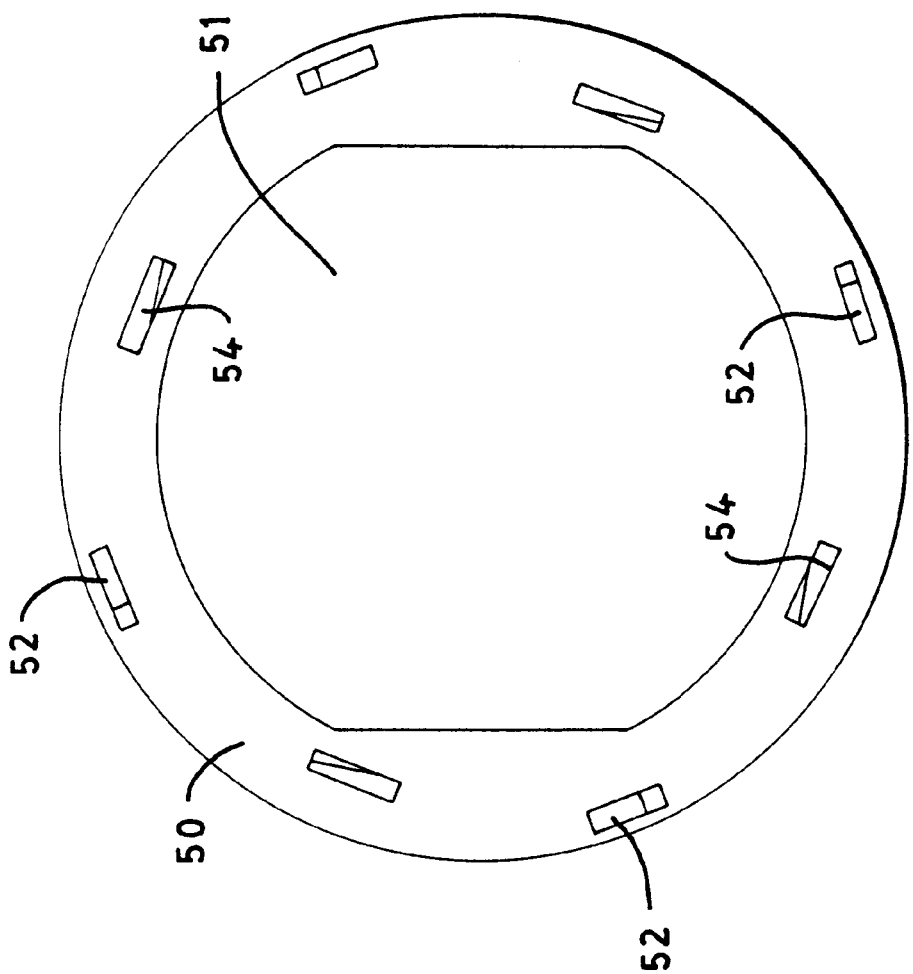
FIG. 13 is a top view of the embodiment of the clutch depicted in FIG. 12.
Figure 12:
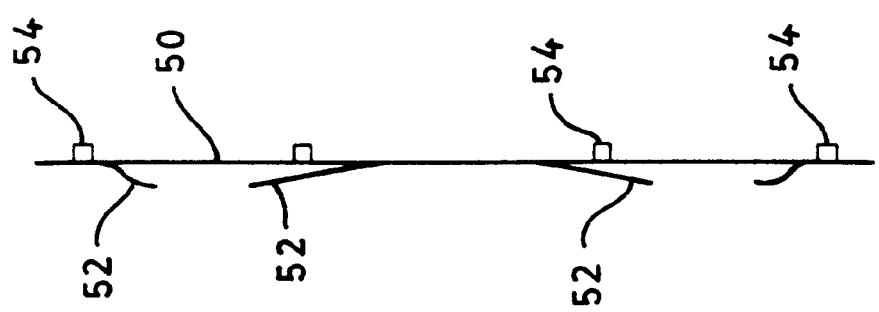
FIG. 12 is a side view of an embodiment of a clutch of the present invention.

FIG. 9 is a top view of an embodiment of the filtering assembly 30 of the present invention, the indicator boss 36 forming an annular boss encircling the mouthpiece 25. FIG. 10 is a cross-sectional view of the embodiment depicted in FIG. 9, taken along line 10—10. As shown therein, the indicator boss 36 has a raised portion 62. In such an embodiment, the upper surface of the raised portion 62 may be colored differently than the remainder of the indicator boss 36.

As shown in FIGS. 4 and 10, the mouthpiece 25 is attached to the mouthpiece post 38. The mouthpiece 25 may be attached to the mouthpiece post 38 in various ways, such as, for example, by providing interlocking snap features on the mouthpiece 25 and/or the mouthpiece post 38. The mouthpiece post 38 includes a plurality of ribs 68 which support the central portion 70 of the mouthpiece post 38. When the mouthpiece 25 is pushed downward onto the mouthpiece post 38, the fluid outlet 64, best seen in FIGS. 4, 5 and 10, is closed, preventing fluid from flowing out of the portable purification system 20. When the mouthpiece 25 is raised, fluid may flow out of the fluid outlet 64, around the central portion 70 and through the mouthpiece 25. This, or any of a variety of standard constructions for mouthpieces may be utilized with the present invention.

When a user desires to have access to freshly filtered fluid, the user fills the container 22 with unfiltered fluid. The user then threadably engages the cap 24, including the filtering assembly 30 and the clutch 50, to the container 22. As the cap 24 engages the upper portion of the container 22, the friction between the cap 24, the filtering assembly 30, and the container 22 causes the filtering assembly 30 to rotate a predetermined distance within the cap 24. The distance that the filtering assembly 30 is advanced with each reattachment of the cap 24 is roughly proportionate to the amount of the useful life of the filter which has been used by the amount of fluid contained within a full container 22. In this manner, the filtering assembly 30 is rotated within the cap 24 so that the indicator boss 36 is gradually moved from its initial position until it is visible, or the colored portion of the indicator boss 36 is visible, through the indicator aperture 60.

When the colored portion of the indicator boss 36 is displayed through the indicating aperture 60 in the cap 24, the user is alerted that the filtering assembly 30 should be removed soon and replaced with a new filtering assembly 30. At such time, the user simply removes the cap 24 from the container 22 and pushed downwardly on the mouthpiece 25. The downward force on the mouthpiece 25 causes the filtering assembly 30 to disengage from the bosses 56 which retain it in place. The user simply places a new filtering assembly 30 into the interior of the cap 24 and pushes it into engagement with the bosses 56, or other similar retention mechanisms provided. As the new filtering assembly 30 can only be installed in a single predetermined position, the indicator of the portable purification system 20 is reset and ready to approximate the useful life of the new filter.

A second embodiment of the present invention is illustrated in FIGS. 14–18. The portable purification system 20 of this second, illustrated embodiment includes a mechanism that releases the filtering assembly 30 from the cap assembly after the cap assembly has been refitted onto the container 22 a predetermined number of times. In a another embodiment, the present invention includes an automatic ejection mechanism that automatically releases and ejects the filtering assembly 30 from the cap assembly after the cap assembly has been refitted to the container 22 a predetermined number of times and then removed from the container 22, thereby preventing a consumer from overusing a filter. Thus, the automatic release mechanism provides a consumer a very noticeable indication as to when the replaceable filter or other arrangement for purifying should be replaced. The predetermined number of times that the cap assembly can be refitted to the container 22 is related to the number of teeth on the mating clutch plate and filter assembly 30 surfaces and can be selected based on the volume of the container 22 and the expected life or the arrangement for purifying. Specifically, the number of teeth on the clutch plate and the number of teeth on the filter assembly 30 can be selected to match the number of times that a filter can be used before the filter should be replaced.

Figure 14:
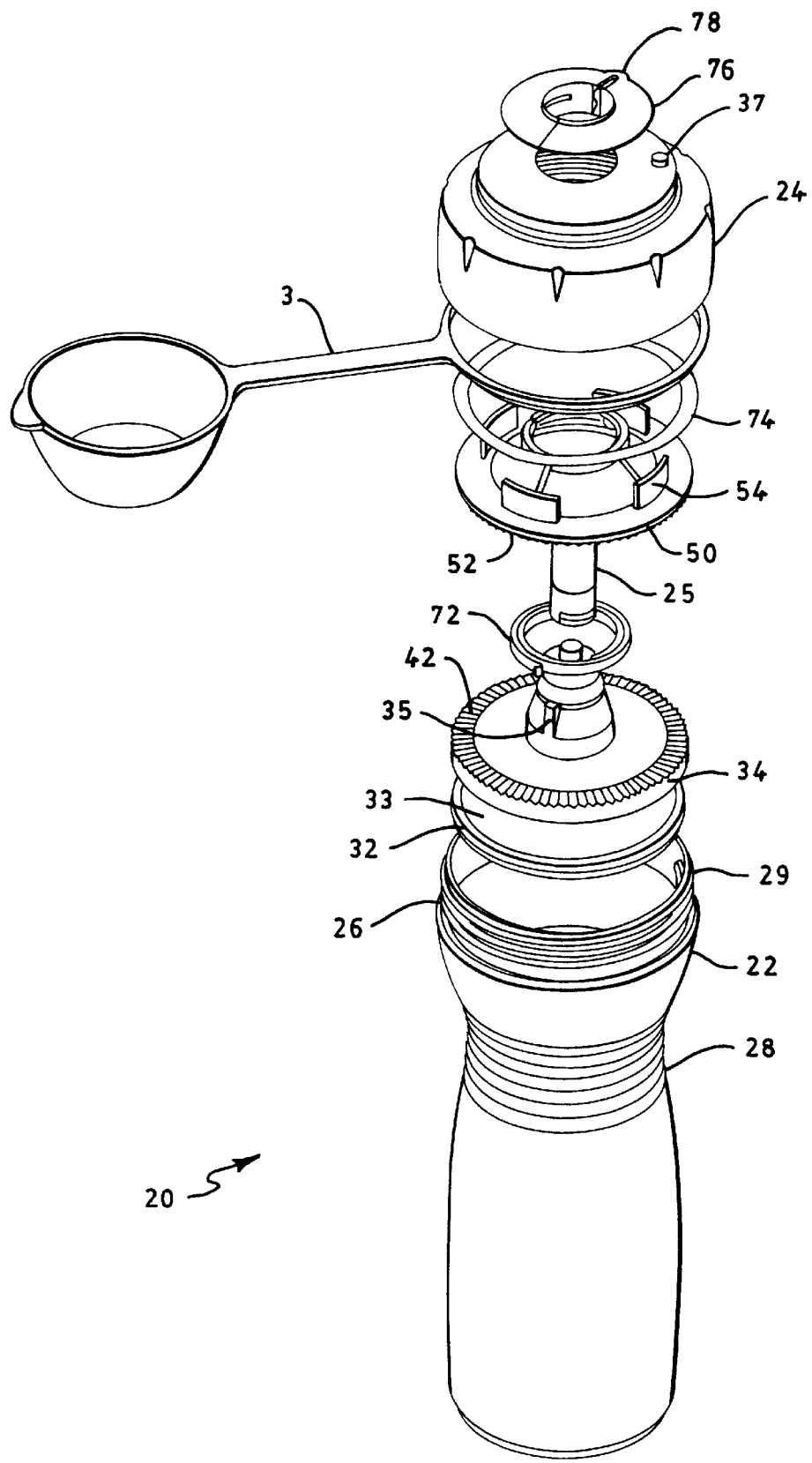
FIG. 14 is an exploded, perspective view of a second embodiment of the present invention.
Figure 15:
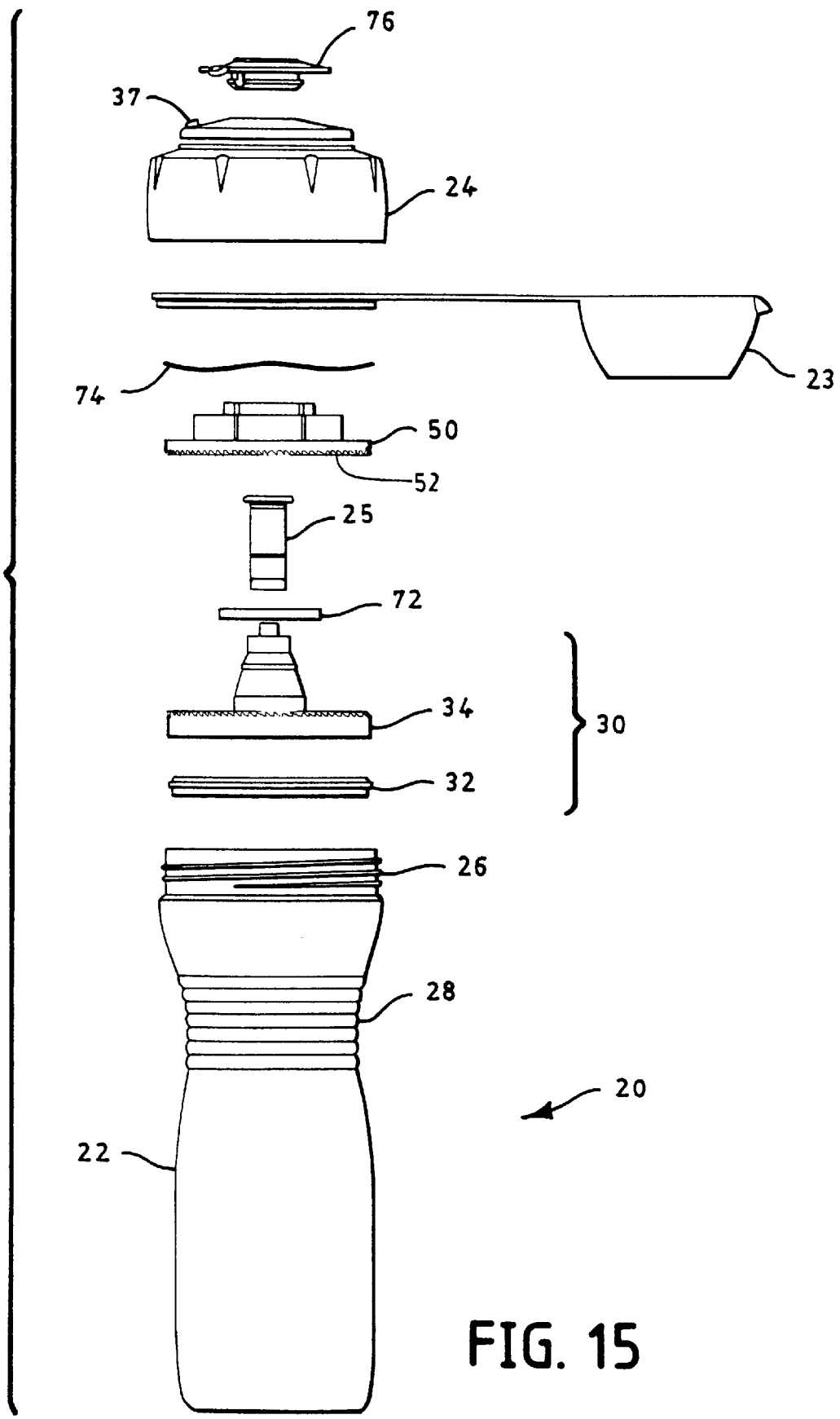
FIG. 15 is an exploded, side view of the second embodiment, illustrated in FIG. 14.
Figure 16:
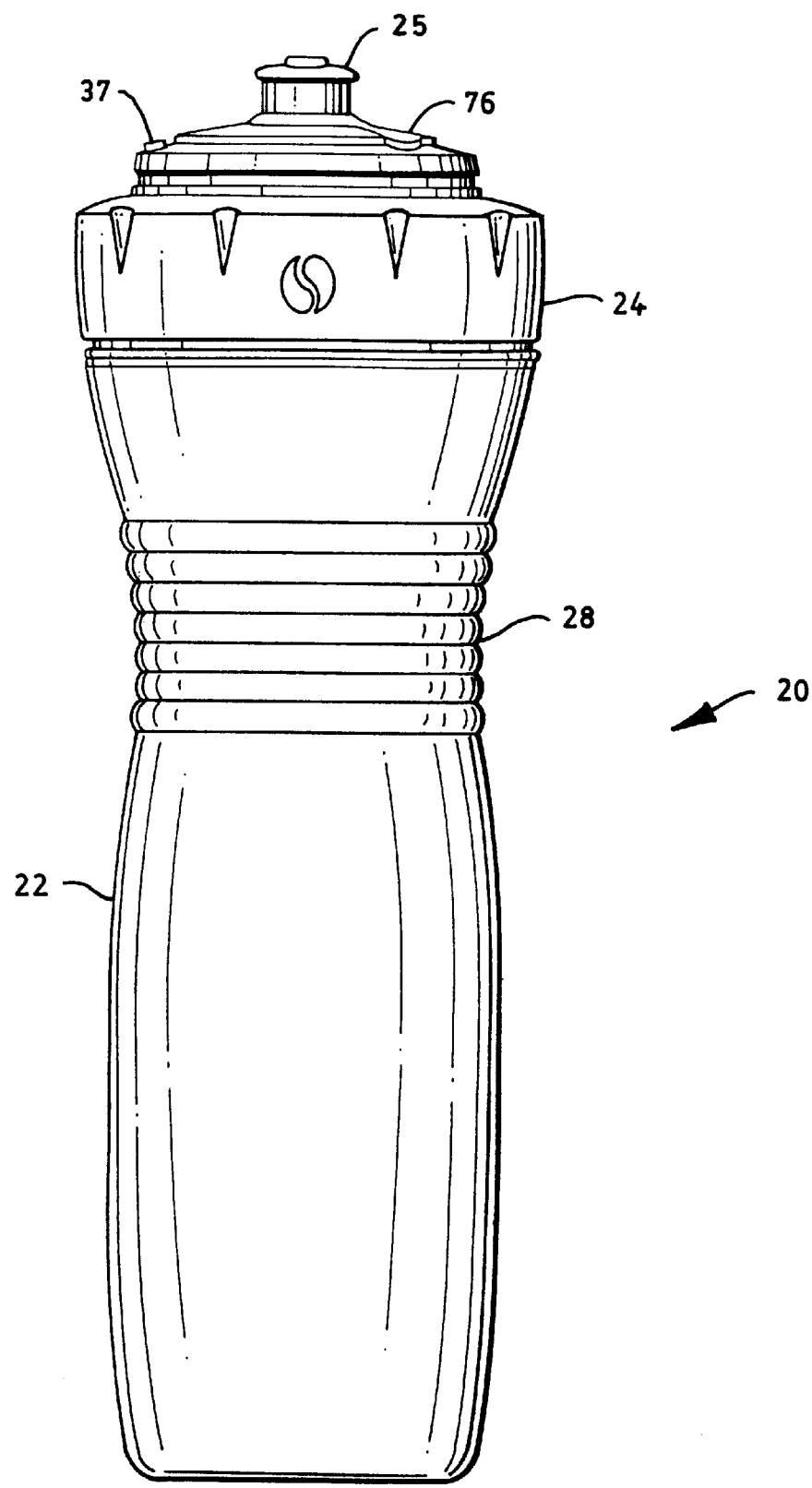
FIG. 16 is a side view of the second embodiment in an assembled condition without a tethered overcap.
Figure 17:
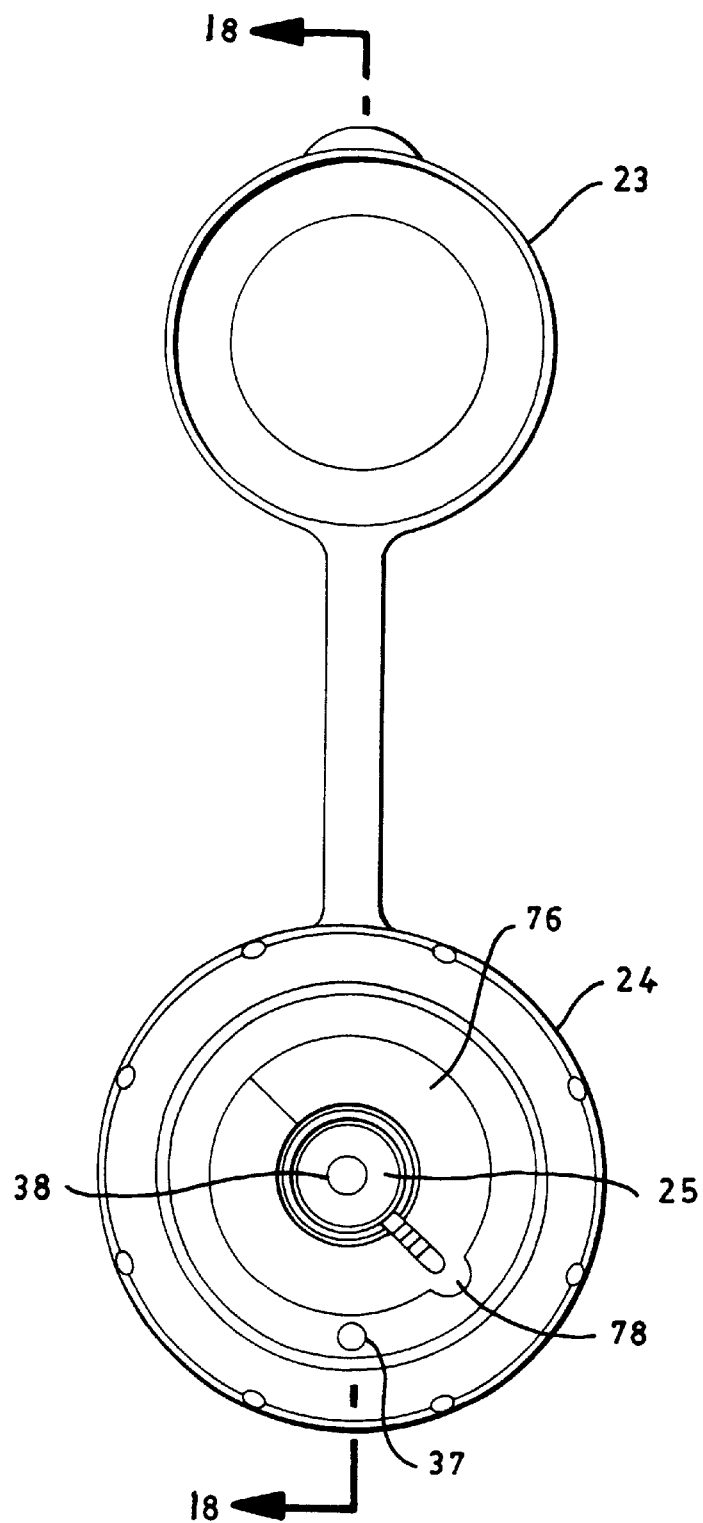
FIG. 17 is a top view of the second embodiment as assembled with a tethered overcap.
Figure 18:
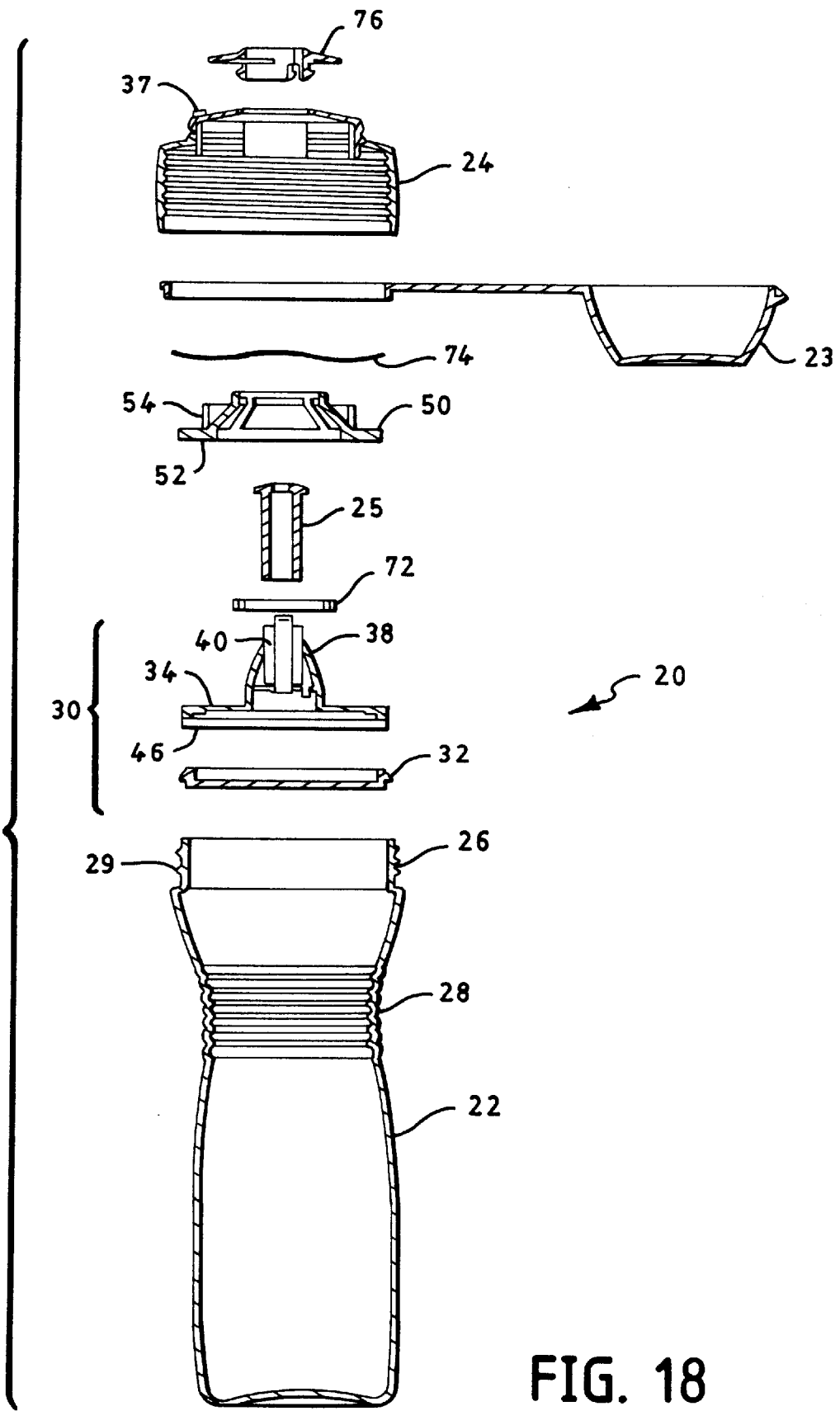
FIG. 18 is an exploded, cross-sectional view of the second embodiment illustrated in FIGS. 14–17, taken along line 18—18.

The second embodiment of the present invention is shown in perspective in FIG. 14. FIG. 15 is a side view of the second embodiment of the portable purification system 20 and illustrates many of the components of the system. FIG. 16 is a side view and illustrates a portable purification system 20 assembled without an optional overcap. FIG. 17 is top view of a cap assembly of the second embodiment and an optional over cap 23. FIG. 18 is an exploded, cross-sectional view of the second embodiment illustrated in FIGS. 14–17, taken along line 8—8 of FIG. 17.

The portable purification system 20 of this second embodiment may include an indicator 76 that is fitted to and rotates within an opening in a cap 24. In the illustrated embodiments, the cap 24 is a screw cap that is mated to and screws onto a container 22. In this embodiment, the indicator 76 comprises a pointer 78 that rests on the upper surface of the cap 24. The indicator 76 and pointer 78 rotate almost 360 degrees. That is, the pointer 78 rotates from one side of a projection 37 provided on the upper surface of the cap 24 to the other side of the projection 37. The indicator generally indicates the number of times that the cap 24 is fitted to a container 22. More specifically, the pointer generally indicates the amount of times the cap is screwed onto the container 22 and can be used to provide an indication as to the number of times the purification system has been used since the filter was replaced. Desirably, the indicator rotates one unit or one audible click each time the cap 24 is screwed onto and is tightened to the container 22 by a mechanism that is described and illustrated herein and is evident with use of the system.

The cap 24 forms part of a cap assembly that, in this second embodiment, may also comprise a resilient member 74 for providing a preload to a clutch plate 50 that also forms part of the cap assembly. The resilient member 74 is placed between the clutch plate 50 and the underside of the cap 24 when the clutch plate 50 is inserted into the underside of the cap 24. The clutch plate 50 rotatively engages the indicator 76. The clutch plate 50 does not rotate relative to the cap 24 and the indicator 76 rotates relative to the cap 24 and the clutch plate 50. In the illustrated embodiment the resilient member is a wave washer or wave spring 74. The purpose of the resilient member is to force a first series of teeth or projections 52 that is provided about the perimeter of the bottom surface of the clutch plate to contact a second mating series of teeth or projections that is provided on the upper member 34 of a filter assembly 30. The first and second series of teeth or projections can comprise any possible number of mating teeth, gears or other projections as long as the first and the second series comprise the same number of mating projections. The teeth, gears or other projections should be shaped so that the one series of teeth can slide over the other series in one direction with normal manual effort but not in the opposite direction. Desirably, the teeth are typically triangular in shape, more desirably right triangular in shape, and produce and audible click when the series of teeth on the clutch plate is rotated relative to the series of teeth on the filter assembly 30. The two series of teeth should associate so that the two series slide over each other in a direction that is the same direction that the cap 24 screws onto the container 22, for example clockwise. Desirably, the first series of similarly shaped teeth each have one vertical or sharply inclined surface and one lesser inclined surface, and the second series of similarly shaped teeth each have one vertical or sharply inclined surface and one lesser inclined surface that mates with the first series of teeth. Most desirably, the number of teeth in each of the series corresponds to the number of times that a removable and replaceable arrangement for purifying that is contained in or otherwise forms a part of the filter assembly 30 can be reused without decreasing in purifying efficiency of the system. For a portable purification system 20 that is within the size and volume range of most sports water bottles, from about one quarter to about one liter, the number of teeth provided on the surface of the clutch plate 50 and the filter assembly 30 should range from about fifty teeth to about seventy-five teeth.

The indicator 78 may further comprise a slot and a groove that align with a key 35 and a projection provided on the filter assembly 30, respectively, so that both the filter assembly 30 and the indicator 78 rotate in unison relative to the cap 24. This key 35 and slot arrangement also helps to ensure that a filter or other arrangement for purifying is inserted into the cap correctly. When the indicator reaches the last position, i.e. the pointer 78 contacts the projection 37, and when additional turning force is applied in the direction that the cap is screwed onto the container 22, i.e. clockwise, the slot and groove in the indicator spreads and releases the key and the projection and thus release the filter assembly 30. The filter assembly 30 is then free to fall out of the cap assembly when the cap is removed from the container 22. The filter assembly or the filter in the filter assembly can then be replaced with a new filter, filter assembly 30 or other arrangement for purifying water.

A constant force or torsion spring 72 shown in FIGS. 14, 15 and 18 may also be provided in the cap assembly to connect the indicator 76 to the cap 24. One end of the constant force or torsion spring is attached to the indicator 76 and the other end of the constant force spring is attached to the cap 24 so that the indicator 76 will rotate to a starting position when a filter assembly 30 is disengaged or otherwise removed from the indicator 78. When the indicator 78 is rotated to the finishing position, almost 360 degrees from the starting position, and additional turning force is applied to the cap assembly, the slot in the indicator opens slightly and the filter assembly is released. Most desirably, the filter assembly ejects from the indicator and the cap assembly when the cap assembly is removed from the container 22 after the filter assembly has been released from the indicator by the arrangement described above and illustrated herein.

An optional tethered overcap 23 is illustrated and may be optionally included with the portable purification system 20 to protect the mouthpiece 25 from dust and debris. Desirably, the overcap is tethered to the portable purification system 20 and has a depth so that the overcap releasably snaps or otherwise engages a portion of the cap assembly and forces the mouthpiece 25 down and into a closed position when the overcap is placed over the mouthpiece 25.

While the invention has been described in detail with respect to specific desirable embodiments, it will be appreciated that those skilled in the art, upon attaining an understanding of the foregoing, may readily conceive of alterations to and variations of the described embodiments. Such alterations and variations are believed to fall within the scope and spirit of the invention and the appended claims.

We claim:

1. A portable purification system comprising a container, a cap removably fitted to the container, and an arrangement for indicating the number of times that the cap has been fitted to the container, wherein the arrangement for indicating comprises a clutch having a plurality of downwardly extending projections, the plurality of downwardly extending projections engaging a plurality of mated and upwardly extending resilient projections located on a filter assembly housing a filter, which upwardly extending resilient projections force the plurality of downwardly extending projections to contact the plurality of upwardly extending resilient projections while allowing the plurality of downwardly extending projections to move over the plurality of upwardly extending resilient projections when the cap is rotated relative to the container.

2. The purification system of claim 1, wherein the system further comprises an arrangement for resiliently forcing the plurality of downwardly extending projections to contact the plurality of upwardly extending projections while allowing the plurality of downwardly extending projections to move over the plurality of upwardly extending projections when the cap is rotated relative to the container.

3. The purification system of claim 1, wherein the plurality of downwardly extending projections comprise a first series of similarly shaped teeth wherein each similarly shaped tooth has one vertical or sharply inclined surface and one lesser inclined surface, and the plurality of mated and upwardly extending projections comprise a second series of similarly shaped teeth wherein each similarly shaped tooth has one vertical or sharply inclined surface and one lesser inclined surface that mates with the first series of similarly shaped teeth of the clutch.

4. The purification system of claim 3, wherein the plurality of downwardly extending projections and the plurality of mated and upwardly extending projections produce an audible click when rotated relative to each other.

5. The purification system of claim 1, wherein a vent allows air to enter the container yet restricts fluid from exiting the container.

6. The purification system of claim 1, wherein the container is squeezable.

7. The purification system of claim 1 further comprising an arrangement for forming an airtight seal between the container and the cap.

8. The purification system of claim 1, wherein the cap is rotatively fitted to the container by rotating the cap clockwise relative to the container and the cap is removed by rotating the cap counter clockwise relative to the container.

9. The purification system of claim 1 wherein the arrangement for indicating comprises a plurality of downwardly extending projections that are shaped to permit the plurality of downwardly extending projections to move over a plurality of upwardly extending projections when the cap is rotated clockwise relative to the container.

10. The purification system of claim 9, wherein the plurality of downwardly extending projections are shaped to resist the plurality of downwardly extending projections from moving over the plurality of upwardly extending projections when the cap is rotated in one direction but not in an opposite direction relative to the container.

11. The purification system of claim 1, wherein the container is squeezable and can be squeezed to force fluid through the filter and out of the opening for dispensing fluid when the cap is fitted to the container.

12. The purification system of claim 1 further comprising an arrangement for allowing air to enter the container and for restricting fluids from exiting the container when the cap is fitted he container.

13. The purification system of claim 1 further comprising an arrangement for forming a seal between the container and the cap when the cap is fitted to the container.

14. The purification system of claim 1, wherein the cap comprises a slot and said filter assembly further comprises a key, wherein said slot and key ensure that the filter assembly is inserted correctly into the cap.

* * * * *